UNITED STATES PATENT OFFICE.

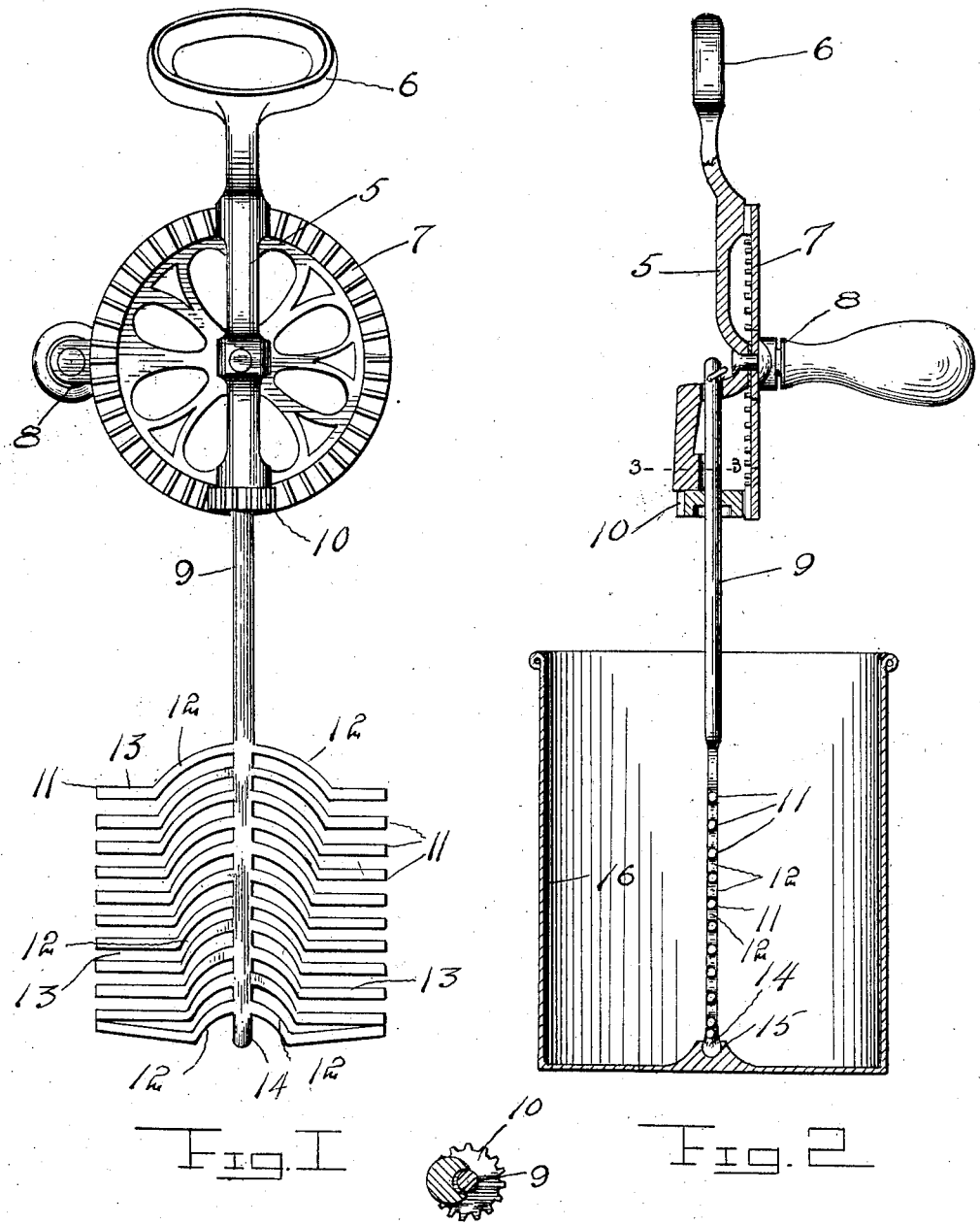

FREDERICK W. LOLL, OF MERIDEN, CONNECTICUT, ASSIGNOR TO F. W. LOLL MANUFACTURING CO., OF MERIDEN, CONNECTICUT.

EGG-BEATER.

No. 833,069.   Specification of Letters Patent.   Patented Oct. 9, 1906.

Application filed November 28, 1905. Serial No. 289,427.

*To all whom it may concern:*

Be it known that I, FREDERICK W. LOLL, a citizen of the United States, residing at Meriden, in the county of New Haven, State of Connecticut, have invented certain new and useful Improvements in Egg-Beaters; and I do hereby declare the following to be a full, clear, and exact description of the invention, such as will enable others skilled in the art to which it appertains to make and use the same.

This invention relates to egg-beaters, and more particularly to those of the rotary type, and has for its object to provide a device of this kind which may be used for beating eggs, whipping cream, and similar operations and which will include a novel arrangement of parts tending to produce a simple and efficient beater.
Other objects and advantages will be apparent from the following description.

In the drawings forming a portion of this specification, and in which like numerals of reference indicate similar parts in the several views, Figure 1 is an elevation of the present beater. Fig. 2 is an edge view, the receptacle being shown in section. Fig. 3 is a section on line 3 3 of Fig. 2.

Referring now to the drawings, the present invention comprises a usual bracket 5, having a hand-grip 6 at its upper end and having journaled vertically thereon a crown-gear 7, provided with an operating-handle 8. A downwardly-extending shaft 9 is journaled in the bracket and has a pinion 10 meshing with the crown-gear. The lower portion of the shaft 9 is flattened, and extending laterally from the edges of the flattened portion in opposite directions there are a plurality of arms 11, which are disposed opposite each other in pairs. These arms adjacent to the shaft are curved downwardly, as shown at 12, and are then turned outwardly, as shown at 13, the portions 13 extending horizontally.
The curved portions of the arms decrease in length from the upper to the lower arms, the horizontal portions thereof being correspondingly increased in length, so that the free ends of the arms lie in lines parallel with the shaft. The inner curved portions 12 of the arms intersect the horizontal planes of the outer portions 13 of the arms next above, as shown. The above is true of all except the lowermost pair of arms, these arms having the inner curved portions 12, but having their outer portions curved outwardly to rest against the ends of the arms next above at their outer extremities. The shaft extends below the lowermost pair of arms and is rounded at its lower end, as shown at 14, for engagement in a centrally-recessed boss 15, located upon the bottom of a receptacle 16.

In use matter to be whipped is disposed in the receptacle and the lower end of the shaft is engaged in the boss, after which the crown-gear is revolved to rotate the shaft.

It will be seen that the outer end portions 13 of the arms will cause the contents of the receptacle to move in horizontal layers, which are broken at their inner portions by the curved portions 12 of the arms, which pass therethrough, and the downward taper of the curved portions causes a different motion for each layer, and consequently greater agitation of the contents is caused than would result from the use of straight arms.

What is claimed is—

1. An egg-beater comprising a shaft, means for rotating the shaft, oppositely-extending pairs of arms carried by the shaft in spaced relation and occupying a common plane, the inner portions of said arms being curved downwardly and their outer portions being turned to extend outwardly, the curved portions of the arms being reduced in length from one end of the series of arms toward the other.

2. An egg-beater comprising a shaft, and oppositely-extending arms carried by the shaft in spaced relation and occupying a common plane, said arms having their inner portions curved toward a common end of the shaft and their outer portions turned to extend at right angles to the shaft.

3. In an egg-beater, the combination with a shaft, of oppositely-extending pairs of arms carried thereby and lying in spaced relation, the outer ends of the arms lying in lines parallel with the shaft, the lowermost arms having their outer portions turned upwardly and resting with their ends against the arms next above.

4. In an egg-beater, the combination with a shaft, of oppositely-extending arms carried by the shaft, the arms at each side of the shaft lying in spaced relation and in a common plane, the inner portions of said arms being curved toward one end of the shaft and their outer portions being turned to extend at right angles to the shaft, the curved portions of the arms being decreased in length from one end of the series of arms to the other, the outer ends of the arms lying in lines parallel with the shaft, a pair of oppositely-extending arms carried by the shaft beyond the other arms and having their inner portions turned in the same direction as the inner portions of the other arms and having their outer portions turned to rest at their ends against the adjacent arms, one end of the shaft beyond the arms being rounded, and a receptacle having a recessed boss therewithin for the reception of the rounded end of the shaft, said arms being disposed upon the shaft to lie within the receptacle when the shaft is engaged in the boss.

5. An egg-beater comprising a rotatable shaft, and vertically-spaced arms carried by the shaft, said arms including inner and outer portions extending at an angle to each other, the inner portion of one arm intersecting the horizontal plane of the outer portion of an adjacent arm.

In testimony whereof I affix my signature in presence of two witnesses.

FREDERICK W. LOLL.

Witnesses:
GEORGE SIERING,
JOHN Q. THAYER.